June 1, 1937.  A. A. BERNDT  2,082,566
CONNECTER
Filed April 11, 1935
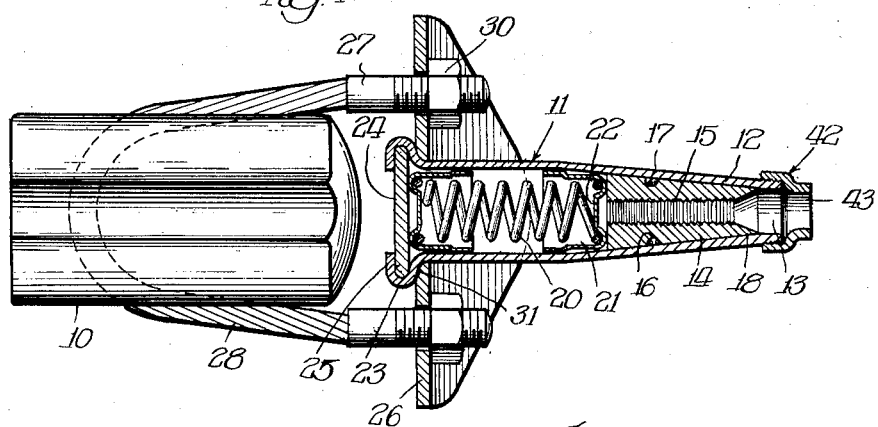
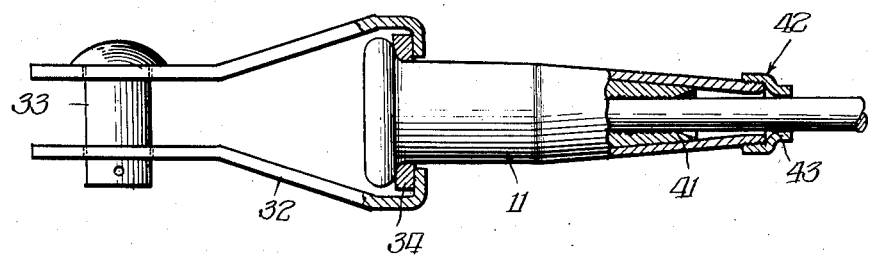
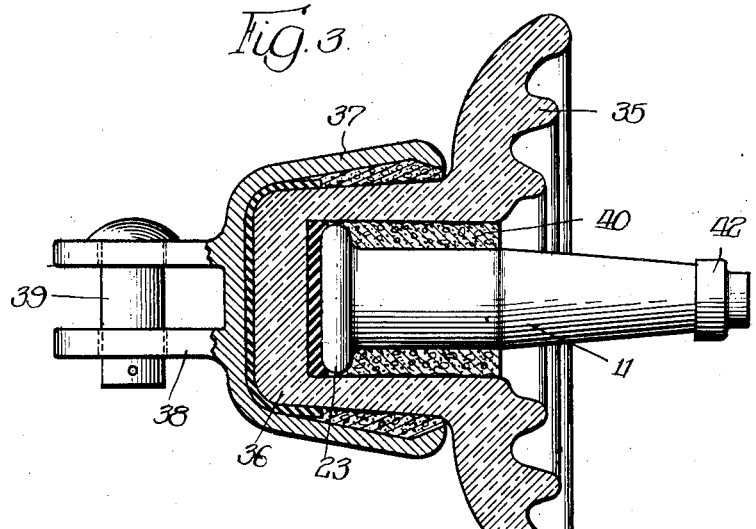
Inventor:
Arthur A. Berndt, Patented June 1, 1937

2,082,566

UNITED STATES PATENT OFFICE 2,082,566

CONNECTER

Arthur A. Berndt, Chicago, Ill., assignor to Electroline Corporation, Chicago, Ill., a corporation of Illinois Application April 11, 1935, Serial No. 15,768

8 Claims. (Cl. 173—366)

The invention relates to connecters and has reference particularly to a dead-end connecter for joining wires to insulators or for anchoring wires to a fixed support.

An object of the invention is to provide a connecter for securely joining a wire such as a guide or stay wire to an insulator of the ball or spool type and which can also be used for joining a wire to a fixed anchorage. The connecter of the invention is characterized by the ease with which it can be assembled, installed and a connection with a wire completed and further by the fact that the joint is as strong as the wire and will withstand excessive vibration without failing.

A more specific object is to provide a dead-end connecter that can be joined to a wire without requiring tools of any kind, that will have all the wire gripping parts enclosed within a casing so that they can not become lost, and which will be of simple and compact construction.

Another object is to provide a dead-end connector that will be reclaimable by relieving the tension on the wire and removing the same by means of a special tool which will spread and release the wire from the gripping members.

Another object resides in the provision of a dead-end connecter including a wire connecting member having an end portion of novel construction for attaching the member to a yoke whereby the same will withstand the maximum tension placed on the wire without failing.

A further object is to provide a cap adapted to be threaded to an end of the wire connecting member of the character and kind disclosed for preventing failure of the wire due to crystallization where the same joins with the connecting member.

With these and other objects in view the invention may consist of certain novel features of construction and operation, as will be more fully described and particularly pointed out in the specification, drawing and claims appended hereto.

In the drawing which illustrates an embodiment of the invention and wherein like reference characters refer to like parts—

Figure 1 is a sectional view of a dead-end connecter embodying the features of the invention shown in association with the ball type insulator;

Figure 2 is an elevational view of a dead-end connecter constructed in accordance with the invention and which has utility for securing a wire to a fixed anchorage; and Figure 3 is a sectional view taken through an insulator showing the wire connecting member of the invention cemented thereto.

In the drawing Figure 1 shows means for connecting a wire to a ball type insulator indicated in its entirety by 10 and which consists essentially of a wire gripping member of similar construction and operating in the same manner as the line splice disclosed and claimed in applicant's prior Patent No. 2,063,718 granted December 8, 1936. The member comprises a tubular housing or casing 11 of any suitable metal, preferably copper or an alloy thereof, having a tapering end portion 12 on the right hand end provided with an end opening 13 of smaller diameter compared to the size of the cylindrical portion of the casing. The walls of the casing in the vicinity of the end opening are slightly greater in thickness than the casing wall at the other points since the extreme outer end of the casing is called upon to withstand severe strains due to the tension placed upon the wire connected thereto.

Located within the casing are a plurality of gripping members 14 which have contact with the tapering walls of the portion 12. Each member is of wedge-shape formation and is formed with a trough or groove extending lengthwise thereof and suitably roughened by means of teeth 15. Each member is also provided on its exterior surface with a groove 16 running transversely of the member and which receives several strands 17 of spring wire for yieldingly holding the members in associated relation to form a set or group of members. The wire is held by the gripping members by imbedding the teeth 15 into the surface of the wire although not to an extent such as would cause damage to the wire. To render the members operative for the purpose of releasing the engaged conductor their ends adjacent the opening 13 are bevelled as at 18. Also the gripping members are flexibly held together to form a small opening which will prevent free passage of the inserted wire, with the result that the members become associated with the end of the inserted wire. Further movement of the wire inwardly until contact is made with the member to be presently described does not alter this relation and the wire is finally gripped with the members engaging the wire for the entire length of the members.

For maintaining the set of gripping members in contact with the tapering wall of the portion 12 a coil spring 20 is located within the casing and confined between the members and the closed end of the casing, the construction of which will be presently described. The coil spring has convolutions of a diameter somewhat less than that of the casing so as to have free movement within the casing and has a length to exert sufficient tension for an operative connecter. The coil spring has its respective ends seating within cup-shaped members 21 provided with a base recessed at 22 for centering the wire held by the gripping members and having an exterior surface which increases in diameter from the base to the open end for purposes which will presently appear. The height of each cup-shaped member, that is, the distance from the base to the rim, is designed to prevent full compression of the coil spring 20. The insertion of a wire within the gripping member continues until its end contacts with the recessed base in the adjacent cup member 21. The act of inserting the wire, however, forces the gripping member away from the tapering walls toward the center of the casing, causing compression of the coil spring 20. In most instances the act of inserting the wire will cause one cup member to contact the other, whereupon further compression of the spring is of course impossible. The cup members are therefore of a height that when they contact sufficient play for proper operation of the gripping members is provided, although the spring is not fully compressed. More specifically, the coil spring can be compressed to the point just short of that where injury due to a permanent set would occur.

It is also noted that the diameter of the base portion of the cup-shaped member is considerably less than the interior diameter of the cylindrical portion of the casing, whereas, the diameter of the cup from the center to rim is somewhat larger and has a slidable fit with said cylindrical portion. The reduced diameter of the base portion of the cup member is necessary as this portion should fit within the tapering end section of the casing when the gripping members are in inoperative position, to thereby give maximum longitudinal movement for the spring and gripping members. The large diameter of the cup controls the slidable movement of the same during compression of the spring in the act of inserting the wire.

The casing 11 of the wire gripping member has its other end or left end enlarged in diameter as at 23, for receiving the end plate 24, the metal of said portion being beaded over the end plate forming the end retaining flanges 25. The enlarged portion 23 could be welded to the casing 11 although it is preferably formed integral with the casing and by beading the end metal over plate 24 to form the retaining flanges 25, a construction is secured that holds the plate to the casing and which can not be forced out or even loosened by tension placed on the casing when held by the yoke 26 as shown.

The dead-end connecter of the invention is completed by the yoke 26, having spaced openings for receiving the threaded members 27 which are joined by the loop of stranded cable 28, passing through and connecting with the insulator 10. The ends of the members 27 extending through the yoke have the nuts 30 threaded thereto to thus connect the loop of stranded cable and the insulator to the yoke. Prior to the assembly of the parts as above described the wire connecting member has been inserted through a central opening provided in the yoke 26 of a diameter which forms a neat fit with the cylindrical portion of the casing 11. The top edges of said opening are preferably rounded to exactly fit the rounded contour of shoulder 31 formed by the enlarged portion 23. This insures against damage to the casing as sharp corners would tend to cut into the metal of the shoulder and thus weaken the casing at these points.

The dead-end connecter can be readily joined to a wire such as a guide or stay wire or to a conductor by merely inserting the end of the wire within opening 13 and forcing the same through the bore provided by the gripping members. The ends of the wire become associated with said gripping members and when tension is placed on the same the members are caused to again engage the walls of the tapering portion, whereupon the teeth 15 bite into the surfaces of the wire, resulting in a firm and secure connection. Tension placed on the wire is transmitted from the casing to the yoke 26 to the stranded cable 28 and finally to the insulator 10 and cable connecting therewith. The joint between the casing and yoke is as strong as the other parts of the connecter as the shoulder 31 is reinforced by the metal plate 24 which in turn is securely held in the ends of the casing by the retaining flanges 25.

The dead-end connecter shown in Figure 2 consists of a wire gripping member constructed similar to that shown in Figure 1 and a yoke 32 which is adapted to be secured to a fixed support or anchorage by means of the securing bolt 33. The joint between the casing 11 of the wire gripping member and the yoke 32 is strengthened by means of a washer or ring 34 which has the edges on one side of the opening therein rounded to conform to the contour of shoulder 31 on casing 11 to insure against weakening of the metal of the casing as explained with respect to the structure of Figure 1.

The dead-end connecter of Figure 3 is also for securement to a support or fixed anchorage but differs from the device of Figure 2 in that an insulator is provided between the support and wire gripping member. The insulator includes a face portion 35 and a recessed base portion 36 which is cemented within the cup member 37 having rearwardly extending spaced flanges 38 for receiving the securing bolt 39 by means of which the connecter is secured to its anchorage. The wire gripping member constructed similar to that shown in Figure 1 is cemented within the recess formed in the base of the insulator. The cement indicated at 40 may be of any suitable composition such that upon hardening a secure bond is formed between the casing 11 and the insulator. In addition to the joint between the parts by reason of the cement the casing 11 is also held to the insulator by the construction of its anchoring end which includes the enlarged portion 23 forming the shoulder 31 and wherein the end metal is beaded over a plate 24 to form retaining flanges 25. Tension placed on the casing 11 in the dead-end connecter shown in Figure 3 will tend to pull the casing from its anchorage in the recessed base of the insulator. Separation of the parts is effectively resisted by the bond provided by the cementing composition 40 and also by the enlarged end portion 23.

In dead-end connecters the vibrations of the wire have been found to cause severing of the wire at 41, Figure 2, the initial point of contact between the same and the gripping members. This will be understood when it is realized that the wire is under compression at this point due to the action of the gripping members and further, the surface of the wire is cut by contact of the teeth 15 with the wire. The vibrations accentuate the cutting action of the teeth and cause the wire to crystallize, with the result that the connection soon fails. To make a practical and serviceable anchorage the invention provides a cap member 42 adapted to be threaded to the end of the casing 11 and having an opening 43 permitting passage of the wire and which is of a size substantially that of the wire. As shown in Figure 1 the walls of the opening are smooth and slightly curved to minimize the danger of scratching or otherwise marring the surface of the wire at this point. With the cap constructed as above described the vibrations in the wire are dampened at the point of contact of the cap with the wire and therefore the vibrations are substantially reduced if not entirely eliminated at the point of initial contact between the wire and the gripping elements. The wire does not crystallize where it contacts the cap since it is not under compression nor is the surface thereof cut as is the case of that portion of the wire held by the gripping elements. The construction makes for a practical connecter for anchoring wires to a fixed support or other anchorage and which will fill all requirements of service.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. A connecter for connecting wires and the like to an anchorage including means having an opening therein, and a wire engaging member fitting within said opening, said member comprising a tubular casing having a bulbous portion on one end thereof of greater diameter than said opening in the means to thus retain the casing and means in connected relation, said other end of the casing being reduced in diameter to form a tapering end portion, and gripping members housed within said end portion for gripping and holding a wire.

2. A connecter for connecting wires and the like to an anchorage including means having an opening therein, and a wire engaging member fitting within said opening, said member comprising a tubular casing having a portion of enlarged diameter on one end thereof providing a shoulder for engaging the edges of the opening in the means to retain the member and means in connected relation, said casing having its other end reduced in diameter to form a tapering end portion, and gripping members housed within the tapering end portion for gripping and holding a wire.

3. A connecter for connecting wires and the like to an anchorage including means having an opening therein, and a wire engaging member fitting within said opening, said member comprising a tubular casing having a portion of enlarged diameter on one end thereof providing a shoulder for engaging the edges of the opening in the means to retain the member and means in connected relation, an end plate located within the portion of enlarged diameter, said plate being held in position by retaining flanges formed by the metal of said enlarged portion, said casing having its other end reduced in diameter to form a tapering end portion, and gripping members housed within the tapering end portion for gripping and holding a wire.

4. A connecter for connecting wires and the like to an anchorage including a yoke having an opening therein, and a wire engaging member fitting within said opening, said member including a tubular casing having a portion of enlarged diameter on one end thereof providing a shoulder for engaging the edges of the opening in the yoke to retain the member and yoke in connected relation, an end plate located within the portion of enlarged diameter and having contact with the metal forming said shoulder, said enlarged portion being beaded over the edges of the plate forming retaining flanges to hold the plate in position, said casing having its other end reduced in diameter to form a tapering end portion, and gripping members housed within the tapering end portion for gripping and holding a wire.

5. A connecter for connecting wires and the like to an anchorage including a yoke having an opening therein, and a wire engaging member fitting within said opening, said member including a tubular casing having a bulbous portion on one end providing a shoulder for engaging the edges of the opening in the yoke to thereby retain the parts in connected relation, the edges of said opening in contact with the shoulder on the casing being rounded to conform to the contour of said shoulder, said casing having its other end reduced in diameter to form a tapering end portion, and means housed within said portion for gripping and holding a wire inserted therein.

6. A connecter for connecting wires and the like, comprising a tubular casing having a tapered end portion, gripping members housed by said tapering end portion and having contact with the walls thereof, the other end of said casing being formed to provide a bulbous portion of enlarged diameter, an end plate securely held within said enlarged portion, resilient means for maintaining the gripping members in engagement with their tapering walls, and dome-shaped members providing seats for the respective ends of said resilient means, one dome-shaped member being located between the gripping members and the resilient means, and the other dome-shaped member being located between the end plate and the resilient means.

7. A connecter for connecting wires and the like, comprising a tubular casing having a tapered end portion, gripping members housed by said tapering end portion and having contact with the walls thereof, the other end of said casing being formed to provide a bulbous portion of enlarged diameter, an end plate securely held within said enlarged portion, a coil spring located within the casing between the gripping members and said end plate, and cup-shaped members having their open ends directed toward each other to provide seats for said coil spring, at least one of said cup-shaped members having a rim portion of larger diameter than the rest of the member for slidably fitting the inside wall of the casing and having its base portion reduced in diameter so as to fit within the tapered end portion of the casing.

8. A connecter for connecting wires and the like, comprising a tubular casing having a tapered end portion, gripping members housed by said tapered end portion and having contact with the walls thereof, the other end of said casing being enlarged in diameter to form a shoulder, an end plate located within the enlarged portion and contacting the metal of said shoulder, said enlarged portion being beaded over the end plate forming retaining flanges to hold the plate in position, a coil spring located between the gripping members and end plate, and cup-shaped members in contact with the gripping members and end plate respectively and having their open ends directed toward each other to provide seats for the respective ends of the coil spring, said cup-shaped members being adapted to engage each other to prevent full compression of the coil spring in the operation of inserting a wire within the casing to be gripped by said gripping member.

ARTHUR A. BERNDT.